(12) United States Patent
Lu et al.

(10) Patent No.: US 8,891,009 B2
(45) Date of Patent: Nov. 18, 2014

(54) SYSTEM AND METHOD FOR RETARGETING VIDEO SEQUENCES

(75) Inventors: Taoran Lu, Studio City, CA (US); Zheng Yuan, Gainesville, FL (US); Yu Huang, Bridgewater, NJ (US); Dapeng Oliver Wu, Gainesville, FL (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 54 days.

(21) Appl. No.: 13/220,000

(22) Filed: Aug. 29, 2011

(65) Prior Publication Data

US 2013/0050574 A1 Feb. 28, 2013

(51) Int. Cl.
*H04N 7/01* (2006.01)
*G06K 9/00* (2006.01)
*G06K 9/46* (2006.01)

(52) U.S. Cl.
CPC .......... *G06K 9/00751* (2013.01); *G06K 9/4671* (2013.01)
USPC ............................... 348/441; 386/69; 386/70

(58) Field of Classification Search
CPC .. H04N 19/00757; H04N 7/012; H04N 5/783
USPC .................... 348/441, 445, 581, 556, 558; 382/298–300; 345/698
See application file for complete search history.

(56) References Cited

U.S. PATENT DOCUMENTS

2005/0100319 A1* 5/2005 Saed ................................. 386/69
2008/0151101 A1* 6/2008 Tian et al. ..................... 348/448
2009/0251594 A1* 10/2009 Hua et al. ...................... 348/441

OTHER PUBLICATIONS

El-Alfy et al. "Mutli-Scale Video Cropping", Multimedia '07 Proceedings of the 15th international conference on Multimedia, 2007, pp. 97-106.*
Boreczky, J.S., et al., "Comparison of video shot boundary detection techniques," Journal of Electronic Imaging, vol. 5(2), Apr. 1996, pp. 122-128.
Deselaers, T., et al., "Pan, Zoom, Scan—Time-coherent, Trained Automatic Video Cropping," IEEE, 2008, 8 pages.
Ell, T.A., et al., "Hypercomplex Fourier Transforms of Color Images," IEEE Transactions on Image Processing, vol. 16, No. 1, Jan. 2007, pp. 22-35.
Guo, C., et al., "Spatio-temporal Saliency Detection Using Phase Spectrum of Quaternion Fourier Transform," IEEE, 2008, 8 pages.
Hou, X., et al., "Saliency Detection: A Spectral Residual Approach," IEEE Conference on Computer Vision and Pattern Recognition, 2007, 8 pages.

(Continued)

*Primary Examiner* — Jefferey Harold
*Assistant Examiner* — Samira Monshi
(74) *Attorney, Agent, or Firm* — Slater & Matsil, L.L.P.

(57) ABSTRACT

A system and method for retargeting video sequences are provided. A method for retargeting a video includes a plurality of frames includes determining saliency information for the plurality of frames, determining a cost metric for the video, and retargeting the video based on the cost metric to produce a retargeted video. The cost metric considers loss due to cropping, scaling, temporal factors, and spatial factors. The retargeting makes use of a crop window for each frame in the plurality of frames.

26 Claims, 7 Drawing Sheets

(56) References Cited

OTHER PUBLICATIONS

Hua, G., et al., "Efficient Scale-space Spatiotemporal Saliency Tracking for Distortion-Free Video Retargeting," Technical Report MSR-TR-2009-87, Microsoft Research, Jul. 16, 2009, 16 pages.

Liu, F., et al., "Video Retargeting: Automating Pan and Scan," ACM Multimedia, 2006, 10 pages.

Patel, N. V., et al., "Video Shot Detection and Characterization for Video Databases," Pattern Recognition, vol. 30, No. 4, 1997, pp. 583-592, Elsevier Science Ltd., Great Britain.

Rubinstein, M., et al., "Improved Seam Carving for Video Retargeting," Mitsubishi Electric Research Laboratories, Aug. 2008, 11 pages.

Shi, J., et al., "Good Features to Track," IEEE Conference on Computer Vision and Pattern Recognition, Jun. 1994, 8 pages.

Tao, C., et al., "Active Window Oriented Dynamic Video Retargeting," International Workshop on Dynamical Vision, ICCV 2007, pp. 1-12.

Wang, Y-S., et al., "Motion-Aware Temporal Coherence for Video Resizing," ACM Transactions on Graphics, vol. 28, No. 5, Article 127, Dec. 2009, 10 pages.

Wolf, L., et al., "Non-homogeneous Content-driven Video-retargeting," IEEE ICCV 2007, 7 pages.

\* cited by examiner

SYSTEM AND METHOD FOR RETARGETING VIDEO SEQUENCES

TECHNICAL FIELD

The present invention relates generally to video processing, and more particularly to a system and method for retargeting video sequences.

BACKGROUND

Videos are a good way to inform, instruct, entertain, and so forth. Digital video further increases the appeal of video by simplifying the storage, distribution, and displaying of video. The popularity of digital video can readily be seen in the wide range of digital devices that are capable of displaying video. These digital devices include televisions, personal video devices, smart telephones, enhanced appliances, computers, and so on.

However, the wide range of devices on which to display the digital video has led to a wide range of frame (or image) sizes, with exemplary frame sizes ranging from full high definition and beyond with thousands of pixels per dimension (e.g., 1920×1080) down to handheld telephones with a few hundred pixels or less per dimension (e.g., 320×240) and many in between.

It is usually not practical and/or feasible to make a video at all of the possible or at least the generally accepted frame sizes. Generally, a video is made at one or two frame sizes and then resized or otherwise converted to match the frame size of the display device used to display the video. Popular resizing techniques use scaling, stretching, cropping, and so forth, to force the video into the desired size.

Video retargeting (or simply, retargeting) seeks to change the frame size of a video while preserving important visual features. In retargeting, frames in an existing video are transformed to fit an arbitrary display. Retargeting aims to preserve a viewer's experience by maintaining the information content of important regions of the frames in the video, while fulfilling the display's aspect ratio. Careless retargeting may result in a retargeted video that results in a very poor viewer experience.

Retargeting may be computationally intensive and may require a large amount of memory. Therefore, there is a need for a system and method for retargeting videos that provides good or better viewer experience that does not require a great deal of computational resources, thereby potentially being a real-time process.

SUMMARY OF THE INVENTION

These and other problems are generally solved or circumvented, and technical advantages are generally achieved, by example embodiments of the present invention which provide a system and method for retargeting videos.

In accordance with an example embodiment of the present invention, a method for retargeting a video including a plurality of frames is provided. The method includes determining saliency information for the plurality of frames, and determining a cost metric for the video, where the cost metric considers loss due to cropping, scaling, temporal factors, and spatial factors. The method also includes retargeting the video based on the saliency information and the cost metric to produce a retargeted video, where the retargeting makes use of crop windows for each frame in the plurality of frames.

In accordance with another example embodiment of the present invention, a device is provided. The device includes a saliency detect unit, a cost unit, and a retargeting unit. The saliency detect unit determines saliency information for a video that includes a plurality of frames. The cost unit determines a cost metric for the video, where the cost metric considers loss due to cropping, scaling, temporal factors and spatial factors. The retargeting unit retargets the video based on the cost metric to produce a retargeted video, where the retargeting unit makes use of crop windows for each frame in the plurality of frames.

In accordance with another example embodiment of the present invention, a system is provided. The system includes a video processor, and a memory coupled to the video processor. The video processor retargets a video based on a cost metric to produce a retargeted video, where the video includes a plurality of frames, where the cost metric considers loss due to cropping, scaling, temporal factors, and spatial factors, and where the video processor makes use of a crop window for each frame in the plurality of frames to retarget the video. The memory stores the retargeted video.

One advantage disclosed herein is that multiple saliency maps and/or cost functions are utilized to determine crop windows. The use of multiple saliency maps may allow for better image cropping results, which will result in a better viewer experience.

A further advantage of exemplary embodiments is that techniques for reducing computational complexity are provided. Reducing the computational complexity may allow for the retargeting of videos in real-time.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a video retargeting system that can retarget a video to any arbitrary aspect ratio.

Figure 1:
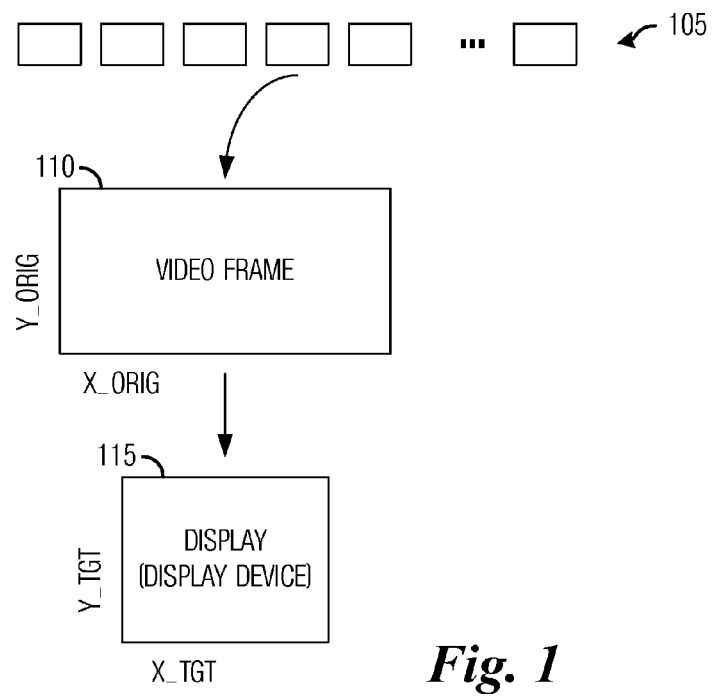
FIG. 1 illustrates an example video retargeting process according to example embodiments described herein.

FIG. 1 illustrates a video retargeting process. As shown in FIG. 1, a video sequence 105 comprises a number of frames. The frames in the video sequence, such as frame 110, have a given size (e.g., X_ORIG pixels by Y_ORIG pixels). When displayed on a display having similar dimension, i.e., the same dimensions or a multiple of the dimensions, no (or very little) visual information is lost.

However, with the wide proliferation of display devices with different dimensions, it may be likely for video sequence 105 to be displayed on a display with a different dimension. In order to display video sequence 105 on such a display without using techniques such as crude cropping or scaling, frames of video sequence 105 may be retargeted to minimize the loss of visual information.

For example, video sequence 105 may be displayed on display 115 with dimension X_TGT pixels by Y_TGT pixels. Retargeting the frames of video sequence 105 may involve the retargeting of each individual frame of video sequence 105 in an intelligent manner to minimize loss of visual information and to preserve viewer experience as much as possible.

Figure 2A:
FIGS. 2a through 2d illustrate example techniques for retargeting a frame according to example embodiments described herein.
Figure 2B:
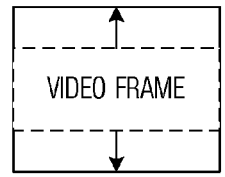
Figure 2C:
Figure 2D:

FIGS. 2a through 2d illustrate a number of techniques for retargeting a frame. FIG. 2a illustrates a frame 200 that has been cropped (in a fixed position, e.g., keep the center region) so that it may fit onto a target display. Cropping an image may also include scaling the image. FIG. 2b illustrates a frame 220 that has been stretched so that it fits onto a target display. FIG. 2c illustrates a frame 240 with added bars to fit onto a target display. FIG. 2d illustrates a frame 260 with a seam removed so that it will fit onto a target display, wherein the seam is deemed to have less visual importance.

Figure 3:
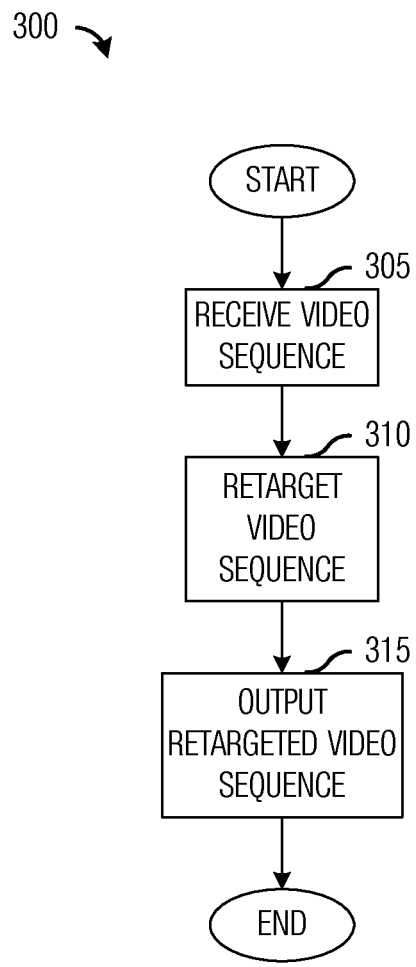
FIG. 3 illustrates an example flow diagram of operations in retargeting videos according to example embodiments described herein.

FIG. 3 illustrates a flow diagram of operations 300 in retargeting videos. Operations 300 may be indicative of operations occurring in a device, such as a video processing system, a computer system, a video transcoder, a video streaming server, a multimedia server, a display device or so forth, as the device retargets a video to meet display device parameters, such as image size. Retargeting may occur prior to delivery to the display device or at the display device. Operations 300 may occur while the device is in a normal operating mode.

Operations 300 may begin with the device receiving a video to be retargeted, referred to hereinafter as the video (block 305). The video may comprise a number of frames, each frame at a given frame size (e.g., X_ORIG pixels by Y_ORIG pixels). The video may be destined to be displayed on a display device with a specific image size (e.g., X_TGT pixels by Y_TGT pixels). Generally, if X_TGT and Y_TGT are not multiples of X_ORIG and Y_ORIG, i.e., larger, equal, or smaller, the video may need to be adjusted so that it displays well on the display device without significant degradation in viewer experience.

The video may be retargeted to meet the display device's image size (block 310). According to an example embodiment, the video may be retargeted using a saliency map-based cropping and scaling retargeting system. In general, a saliency map is a metric that measures an importance of pixels in each frame and includes both spatial and temporal (motion) attention features. The spatial attention may be computed in a frequency domain of a color frame by quaternion Fourier transforms (QFT) on phase spectrum, and/or by object (face) detection, as examples. The temporal (motion) attention may be computed from any of a wide range of motion estimation methods, including but not limited to block-based motion estimation, scale-invariant feature transform (SIFT) correspondence based motion estimation, optical flow, phase correlation, a residual of global motion compensation (where the global motion may be robustly estimated with either a direct (pixel-based) method or a feature (such as, a Kanade-Lucas-Tomasi (KLT) tracking features or SIFT features)-based method), or so forth. Both attention (the spatial attention and the temporal attention) models may be fused together, by a nonlinear method that imitates the characteristics of human attention, or by a linear weighted average method, for example.

The retargeting technique provides good efficiency by offering low computation cost and good trade-off on overall performance and is constructed based on a spatial-temporal optimization process. In optimization, a sum of cropping and scaling information loss may be minimized where a scaling loss is measured with a result of down-sampling and up-sampling. In order to jointly consider visual information preservation while maintaining temporal coherence, dynamic programming may be applied for each shot in the video, which realizes global optimization over cropping location and scaling factor.

The retargeting technique makes use of cost metrics that consider cropping loss and/or scaling loss for individual frames in the video, as well as spatial factors and/or temporal factors for the video as a whole.

After retargeting, the retargeted video may be outputted (block 315). The retargeted video may be sent to the display device if the retargeting occurred in a device different from the display device or the retargeted video may be displayed if the retargeting occurred in a device co-located with the display device.

Figure 4:
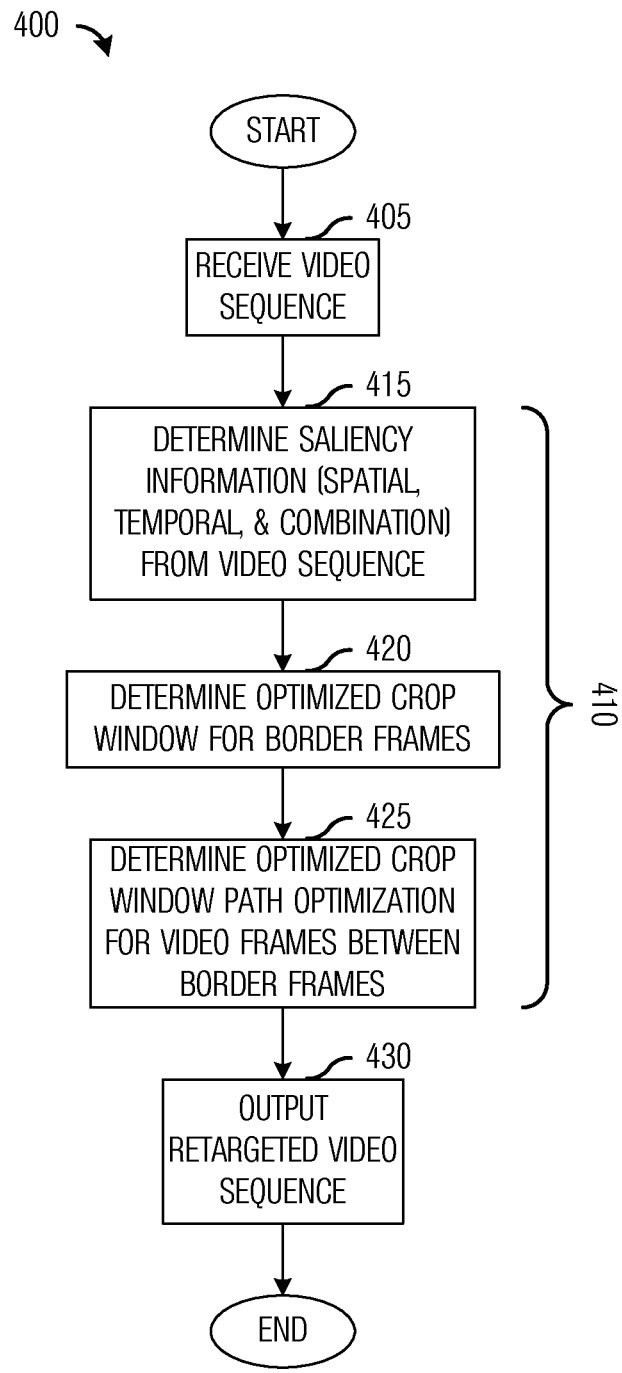
FIG. 4 illustrates an example flow diagram of detailed operations in retargeting videos according to example embodiments described herein.

FIG. 4 illustrates a flow diagram of detailed operations 400 in retargeting videos. Operations 400 may be indicative of operations occurring in a device, such as video processing system, a computer system, a video transcoder, a video streaming server, a multimedia server, display device, and so forth, as the device retargets a video to meet display device parameters, such as image size. Retargeting may occur prior to delivery to the display device or at the display device. Operations 400 may occur while the device is in a normal operating mode.

Operations 400 may begin with the device receiving a video to be retargeted (block 405). The video comprising a number of frames. The structure of the video may be analyzed before the retargeting process using scene/shot detection methods. According to an example embodiment, the analysis of the video may result in a segmentation of the video into multiple video segments. The video may be retargeted by a retargeting process (blocks 410). According to an example embodiment, the retargeting process retargets the video to meet the display device's parameters, such as image size, using a saliency map-based cropping and scaling retargeting system.

Saliency information, e.g., spatial, temporal, and a combination thereof, may be determined from the video (block 415). The saliency information may be determined for each frame in the video sequence. According to an example embodiment, a nonlinear-fused spatial-temporal saliency information detection technique that incorporates, for example, a phase spectrum of quaternion Fourier transform (PQFT) method, may be used to obtain a spatial saliency map and a global motion estimation method to detect a motion saliency map. Both saliency maps, which are in different domains, may then be fused in a spatial-masked non-linear manner.

Figure 5:
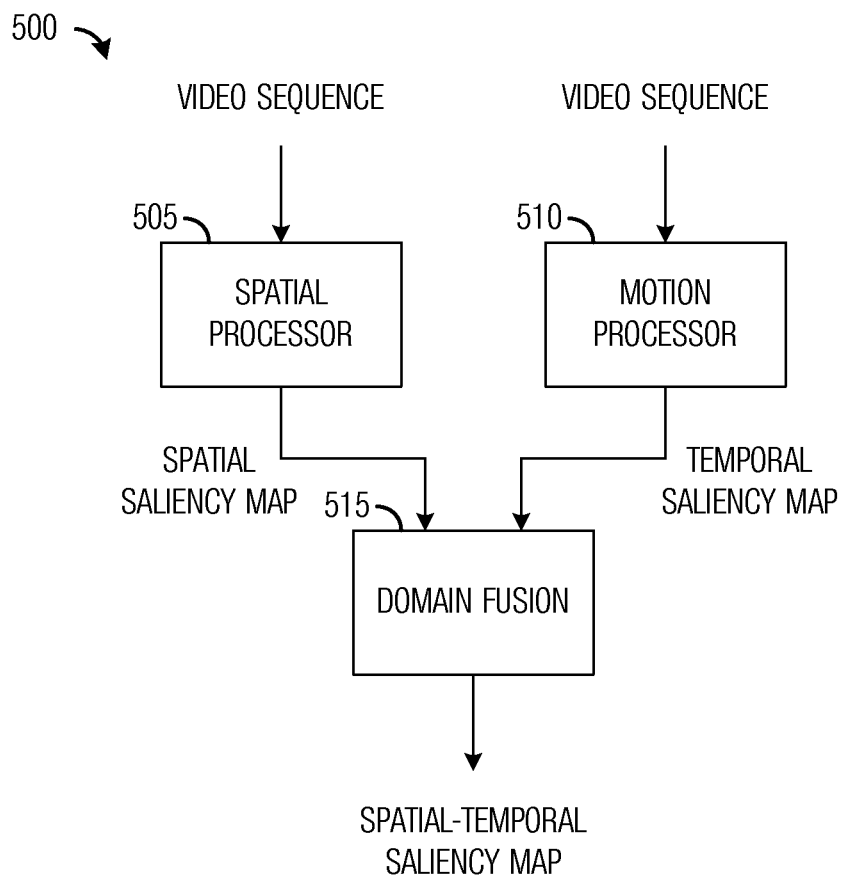
FIG. 5 illustrates an example saliency information unit according to example embodiments described herein.

FIG. 5 illustrates a saliency information unit 500. Saliency information unit 500 may be an implementation of block 415 of FIG. 4. Saliency information unit includes a spatial processor 505 that may be used to obtain a spatial saliency map.

According to an example embodiment, spatial processor 505 may obtain the spatial saliency map as follows. Denote an n-th frame in the video as F(n). Furthermore, let $Y(n)$, $C_b(n)$, $C_r(n)$ be the luminance and chrominance components for F(n). The image may then be represented as a quaternion image $$q(n) = Ch_1(n) + Ch_2(n)\mu_1 + Ch_3(n)\mu_2 + Ch_4(n)\mu_3,$$

where $\mu_i$, $i=1, 2, 3$ satisfies $\mu_i^2 = -1$, $\mu_1 \perp \mu_2$, $\mu_2 \perp \mu_3$, $\mu_1 \perp \mu_3$, $\mu_3 = \mu_1 \mu_2$. $Ch_j(n)$, $j=1, 2, 3, 4$ are the channels of the quaternion image.

For simplicity, the $Y(n)$, $C_b(n)$, $C_r(n)$ components may be placed into channels two to four to make the quaternion a pure quaternion. Furthermore, the q(n) may be represented in symplectic form as $$q(n) = f_1(n) + f_2(n)\mu_2$$

$$f_1(n) = Ch_1(n) + Ch_2(n)\mu_1$$

$$f_2(n) = Ch_3(n) + Ch_4(n)\mu_1.$$

Therefore, the QFT of the quaternion image q(x,y,n) is expressible as $$Q[u, v, n] = F_1[u, v, n] + F_2[u, v, n]\mu_2$$

$$F_i[u, v, n] = \frac{1}{\sqrt{WH}} \sum_{y=0}^{W-1} \sum_{x=0}^{H-1} e^{-\mu_1 2\pi(\frac{yv}{W} + \frac{xu}{H})} f_i(x, y, n)$$

where (x,y) is the spatial location of each pixel, W and H are image's width and height, and [u,v] is the frequency. It is noted that the PQFT is determined on a resized image whose width equals to 64 pixels, which provides good saliency detection performance with low computation cost. It is also noted that when the quaternion is decomposed into symplectic form, the selection of $\mu_i$ is implicit for the calculation of $F_i$. Thus, a simplification technique presented in a paper by Ell, T. and Sangwine, S., "Hypercomplex Fourier Transforms of Color Images," 2001 Proceedings of International Conference on Image Processing, 2001, is adopted for taking all the $\mu_i = i$, where $i^2 = -1$.

The inverse transform is expressible as $$f_i[x, y, n] = \frac{1}{\sqrt{WH}} \sum_{v=0}^{W-1} \sum_{u=0}^{H-1} e^{\mu_1 2\pi(\frac{yv}{W} + \frac{xu}{H})} F_i(u, v, n)$$

Representing the Q[u,v,n] in polar form as (for simplicity, denote Q[u,v,n] as Q[n]):

$$Q[n] = \|Q[n]\| e^{\mu(\angle Q[n])}.$$

The phase spectrum of Q[n] is expressible as $$Q_P[n] = Q[n]/\|Q[n]\|$$

The inverse Quaternion Fourier Transform of the phase spectrum is expressible as $$SM_{spatial} = g * \|q_P(n)\|^2,$$

where g is a two-dimensional Gaussian smoothing filter.

A motion processor 510 may obtain the motion saliency map as follows. Instead of simple frame differencing methods or magnitude of optical flow methods, a residual of global motion compensation is used as motion salient regions. The use of residual of global motion compensation may be preferable since human vision tends to factor out global motion caused by camera movement. According to an example embodiment, the global motion model can be simple or complicated, such as translation, affine, planar perspective transform, and so on. Furthermore, the global motion estimation can be pixel-based or feature-based (KLT tracking or SIFT matching, as examples). Considering a real-time processing requirement, a feature-based method, such as the KLT feature tracker, is suggested to estimate the global motion between adjacent frames. Good features are located by examining a minimum eigenvalue of each 2×2 gradient matrix, and the good features are tracked using a Newton-Raphson method of minimizing the difference between the two windows.

To perform an example algorithm, denote the n-th frame in the video sequence $F_n$. The displacement of a point $x = (x,y)^T$ at $F_{n-1}$ to $F_n$ may be represented as $d = (d_x, d_y)^T$, a six-parameter affine model is adopted $$d = Dx + t,$$

where D is the deformation matrix and t is the translation vector that are expressible as $$D = \begin{bmatrix} d_{xx} & d_{yx} \\ d_{xy} & d_{yy} \end{bmatrix}$$

$$t = [t_x, t_y]^T.$$

Thus, the point x in $F_{n-1}$ moves to point $x' = Ax + t$ in $F_n$, where $A = I + D$ and I is a 2×2 identity matrix. The model parameters are estimated by minimizing the dissimilarity as $$\epsilon = \iint_W (F_n(Ax+t) - F_{n-1}(x))^2 w(x) dx.$$

To robustly estimate the affine parameters, robust methods such as M-estimator, RANSAC or Least Mean of Squares may be used. When A and t are obtained, the global compensated image is generated by warping with the estimated A and t, and the absolute difference of the original frame $F_n$ with its global-compensated version $F_n'$ is taken as the motion saliency map expressible as $$SM_{motion} = abs(F_n - F_n').$$

A domain fusion unit 515 may then fuse the spatial saliency map and the motion saliency maps. When both the spatial and temporal saliency maps are available, the final saliency map is generated by a spatial-masked nonlinear manner. The nonlinear fusion scheme may be based on the following observations of human perceptual properties:

a. If no particular interest excitation exists, humans tend to look at the center of the frame, instead of the borders.

b. The human visual perception process comprises a "stimulating" phase and a "tracking" phase, defined as saccade and persuit in human vision theory. First, the spatial salient region pops out to perform as the "stimulus." At this time, if there are no significant motion activities, the "lazy" human eyes will continually focus on the spatial salient regions. The phenomenon may be referred to as "tracking." If there are several spatial salient regions and one region has significant motion activity, human eyes will tend to focus more on this region, which makes this region have a higher saliency value. Thus, the motion stimulus strengthens the spatial stimulus.

c. Occasionally there are still some special cases. For example, an image that is not at all spatially salient becomes motion salient. However, professional photographers and moviemakers will try to prevent this from happening since this kind of motion stimulus will distract from the spatial stimulus. The rapid changing of stimulus will tend to cause an uncomfortable feeling to viewers.

According to an example embodiment, the nonlinear fusion technique involves multiple steps: Step 1—spatial masking and Step 2—nonlinear fusion.

In Step 1, a 2-D Gaussian layer G centered at a frame center is fused to the spatial saliency map to deal with feature as $$SM_{spatial} = SM_{spatial} \times G.$$

A binary mask of spatial saliency may be obtained by thresholding expressible as $$Mask_{spatial-active} = binary(SM_{spatial} > Th).$$

The threshold Th may be estimated by, for example, $$Th = 10\% \times Max(SM_{spatial}).$$

In Step 2, human visual system features may be imitated by $$SM = Max(SM_{spatial}, SM_{motion} \cap Mask_{spatial-active}).$$

The Max operator is used preferably to avoid a depression of non-strong saliency regions caused by renormalization.

Referring back to FIG. 4, after determining saliency information, crop windows, as well as scaling thereof, may be determined for each frame (block 420) and an optimized crop window path may be determined for the video (block 425). Determining the optimized crop window path may make use of the saliency information, crop windows for border frames, scaling information for the crop windows, or combinations thereof.

Using the saliency information as inputs, an optimized crop window for each frame may be chosen. Furthermore, regions of interest within the crop windows may be defined for use as retargeting content. A crop window may be defined by its upper left hand corner (x, y) and a scale s. Then, the cropped content of each frame may be scaled (zoomed in or out, for example) to fit the display device's screen size. Zooming will not cause geometric distortion because the aspect ratio of the crop windows remains unchanged at all times, but it may cause image quality degradation. Therefore, a scaling loss is also measured. The cropped and scaled (e.g., zoomed in or out) images may then be brought together to form the retargeted video (block 430).

The example embodiments presented herein avoid geometric reorganization of pixels when rendering the retargeted video. Therefore, the retargeted video may be free from strange shape deformation, which may be readily identified by viewers and are typically considered to be among the most intolerable of visual artifacts. Instead, optimized crop windows may be used to render the retargeted video. When retargeting individual frames, a goal may be to find an optimized crop window having the smallest loss of both saliency importance and scaling degradation.

Due to cropping, some information may be lost at boundary areas of images. However, it is normal to place objects of interest at or near a center region of an image, therefore, boundary areas typically contain less important information.

Even though "saliency important" pixels may happen to be scattered across an entire image so that it may be difficult to include all of them in the optimized crop window, the example embodiments may alternatively adapt the scale of the crop window at the price of resolution. Generally, viewers may still get the overall impression of objects of interest, which is represented by those "important" pixels. The scaling matches the advantage of pixel-reorganizing methods that handle such situations by segregating apart important objects and then squeezing them closer to fit in the retargeted display. Therefore, with the pixel reorganizing methods, the viewer does not miss any important objects. However, the geometric distortion side-effect generally results in an unacceptable retargeted video.

One step in retargeting the video is how to determine the optimized crop window path over the temporal axis. On one hand, when viewers watch the retargeted video, they only see the region of interest within the crop window and lose all of the content outside the crop window. Therefore, within the constraint of the limited image size of the display device, it is desirous to save as much information of the video as possible, which may be defined as the fidelity of the retargeted video.

On the other hand, since the crop windows of neighboring frames are not necessarily the same, so the resultant retargeted video frames are not registered by nature, retargeting may introduce temporal artifacts, such as sudden jitter, shake, zoom in and zoom out discontinuities, and so forth, in the retargeted video. These temporal artifacts may result in a low quality viewer experience. Therefore, it may also be desirous to keep the temporal artifacts within a hard to perceive range, which may be defined as eye inertness of the retargeted video.

As described above, fidelity deals with the novelty of each particular frame and is independent of past frames or future frames. The desire may be then to crop a window so that as much information of original video is preserved as possible. An information loss function can be defined to measure the fidelity of a particular frame of the retargeting video with respect to a corresponding frame of the video (i.e., the original video) as $$I = I_{crop} + \lambda \cdot I_{resize},$$

where I is the total information loss within one frame, $I_{crop}$ is the information loss due to those missing boundary pixels that fall outside the crop window, $I_{resize}$ is the information loss due to resolution degradation by resizing crop window into the retargeted size, and $\lambda$ is the weight between these contradictory info-loss clues.

The cropping loss $I_{crop}$ may be calculated as $$I = 1 - \sum_{(i,j) \in W} SM(i, j),$$

where W is the cropping window, SM is the normalized saliency map for the particular frame, and $$\sum_{(i,j)} SM(i, j) = 1.$$

The resizing loss $I_{resize}$ for a given scaling factor s may be calculated as $$I_{resize} = \sum_{(i,j) \in W} \left(F(i, j) - \hat{F}(i, j)\right)^2$$

where $\hat{F}(i, j)$=UpSampling(DownSampling(F(i,j),s),s).

While fidelity may be independent of past and future frames, eye inertness may be dependent on the transition of the optimized crop window between adjacent frames along the time axis. If there is a sudden change in crop windows of neighboring frames, whether from displaced upper-left corners or scale differences, viewers may easily identify resulting artifacts. Therefore, a goal here may be to make the optimized crop window coherent across neighboring frames, which may be expressible as $$EI(t) = |W(t) - W(t-1)|,$$

where EI(t) is the artifacts perceived from frame t−1 to frame t and W(t) is the optimized crop window of frame t.

Typically, there are several different types of artifacts that may be present in the retargeted video, including sudden shifts, sudden zoom changes (in and/or out), and so forth. The sudden shifts correspond to large disparities in the location (e.g., the upper left hand corner) of the optimized crop windows of neighboring frames, while the sudden zoom changes correspond to large variations in scale s of the optimized crop windows.

In general, human eyes have different degrees of tolerance for the two types of artifact. For sudden shifts (i.e., {x, y} location changes), viewers generally think it is reasonable to pan or shift the video display in order to track an object of interest and may therefore have a large degree of tolerance. However, when a sudden zoom occurs (even with a small scale change), viewers may take notice and consider it abnormal since sudden zoom changes are considered to be a relatively rare occurrence.

Additionally, viewer tolerance of a single artifact type may change significantly depending on different situations. For example, the viewer may readily identify artifacts such as sudden shifts or sudden zooms if the content of neighboring frames contains similar content. However, if the artifacts occur at a shot change (i.e., a significant change in content), the viewer may not so readily identify the artifacts since the corresponding change in content overrides the artifacts. Therefore, for visually independent segments, viewers may consider the artifacts to be consistent with the change in content.

Figure 6:
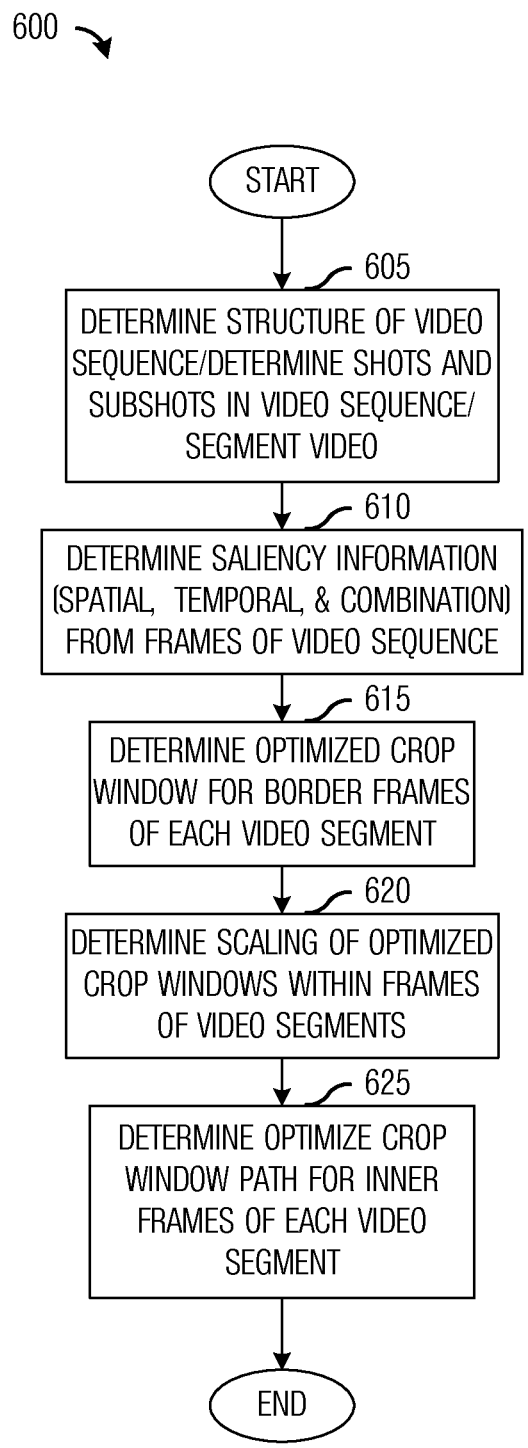
FIG. 6 illustrates an example flow diagram of retargeting operations in retargeting videos according to example embodiments described herein.

FIG. 6 illustrates a flow diagram of retargeting operations 600 in retargeting videos. Retargeting operations 600 may be an implementation of retarget video sequence, block 310 of FIG. 3. Retargeting operations 600 may be indicative of operations occurring in a device, such as video processing system, a computer system, a video transcoder, a video streaming server, a multimedia server, display device, or so forth, as the device retargets a video to meet display device parameters, such as image size. Retargeting may occur prior to delivery to the display device or upon delivery at the display device. Retargeting operations 600 may occur while the device is in a normal operating mode.

Retargeting operations 600 may begin with a determination of a structure of the video, determining shots and subshots, as well as segmenting the video (block 605). As discussed above, a shot may comprise a number of frames containing related content and different shots may contain different content. A shot may be partitioned into one or more subshots, with each subshot in the same shot typically comprising a same number of frames. A number of frames in each subshot may be arbitrarily determined or may be based on the frames within the shot, except the last one generally with a remainder number of frames. Also, subshots of different shots may have the same number of frames or they may be different. Furthermore, the number of frames in a shot is determined by content change detection techniques, which include intensity covariance, color histogram change detection, motion detection method, compression domain differences, edge tracking, motion vectors, and so on.

Figure 7:
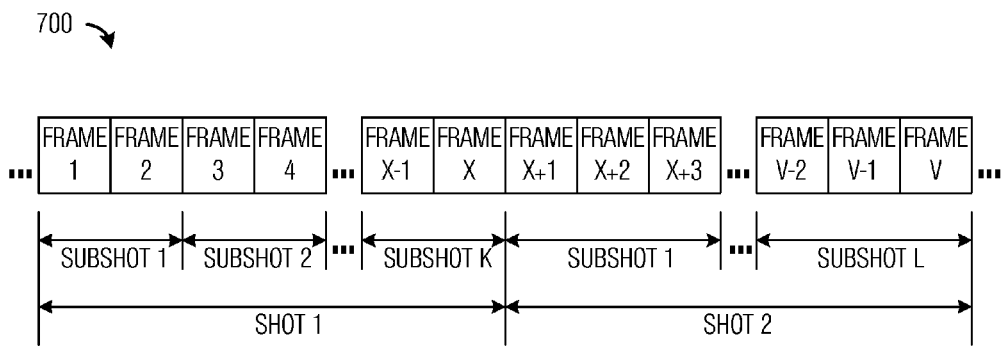
FIG. 7 illustrates an example video partitioned into shots and subshots according to example embodiments described herein.

FIG. 7 illustrates a video 700 partitioned into shots and subshots. Video 700 comprises a plurality of frames that may be partitioned into a number of shots. As shown in FIG. 7, a shot "SHOT 1" may include a plurality of frames with content labeled as "FRAME 1" to "FRAME X" and a shot "SHOT 2" may include a plurality of frames with contents labeled as "FRAME X+1" to "FRAME V." Both SHOT 1 and SHOT 2 may, in turn, be partitioned into multiple subshots, such as SUBSHOT 1, SUBSHOT 2, and SUBSHOT K for SHOT 1 and SUBSHOT 1 and SUBSHOT 2 for SHOT 2.

Frames at the beginning and the end of each shot or subshot may be referred to as border frames, while frames in between border frames of each shot or subshot may be referred to as inner frames. For example, "FRAME 1" and "FRAME 2" are border frames of subshot 1 of shot 1, while "FRAME V−2" and "FRAME V" are border frames of subshot 2 of shot 2 and "FRAME V−1" is an inner frame of subshot 2 of shot 2.

Partitioning of the video into shots may use techniques such as pixel differences, statistical differences, histograms, compression domain differences, edge tracking, motion vectors, and so on. Some are particularly well adapted to detect sophisticated scene changes like fade-in and fade-out. According to an example embodiment, a variance-difference based approach may be used to detect shots, which may detect cut transitions as well as fades. In variance-difference based shot detection, the variance of a frame is calculated and a delta variance with a previous frame $D_{var}$ is recoded. The criteria for $D_{var}$ to start a new shot may include:

a. $D_{var}$(current)<Th1 (a stability requirement);
 b. maxD$_{var}$(start to current)−minD$_{var}$(start to current)>Th2 (a tolerance requirement); and
 c. Frame number in current shot>Th3 (a shot length requirement).

Returning now to FIG. 6, the device may determine saliency information, e.g., spatial, temporal, and a combination thereof, may be determined from frames of the video (block 610). Determination of saliency information was described in greater detail above.

The device may determine optimized crop windows for border frames of the video segments (block 605). According to an example embodiment, the video segments may comprise shots (if shots are the finest granularity of the video segments) or subshots (if subshots are the finest granularity of the video segments). However, if the video is not segmented at all, then the video in its entirety may be considered to be a single video segment. According to an example embodiment, the optimized crop windows may be determined based on the frames themselves, along with saliency information, such as spatial saliency information, temporal saliency information, fused spatial-temporal saliency information, or combinations thereof, generated from the frames of the video. By enforcing continuity within a shot, artifacts such as sudden zooms may be reduced, thereby maintaining a high viewer experience.

Within a single shot, the video contents may be quite consistent, and the viewer may easily detect artifacts if they see a sudden zoom in and/or out (even if the zoom amount is very small). Therefore, a scale s for the entire shot may be fixed and the scale s may be optimized according to the scaling scheme presented in detail below. However, sudden shifts of crop windows may be allowed as long as the consequent artifacts keep at an acceptable level. The acceptable level may be determined on a case by case basis and may be dependent on factors, such as video quality, display system image size, viewer subscription level, cost of retargeted video, and so on. In fact, shifts in the crop window may be needed in order to efficiently reduce the information loss of video. Based on saliency maps, the crop window may be panned and shifted to preserve those pixels which contain more information.

A subshot is a secondary unit for processing in order to maintain the computational load within an affordable level. For example, it may be possible to divide a shot into multiple equal-length subshots by a predefined length. At border frames of a subshot, a search (e.g., a brute force search) may be used to find the optimized crop windows (block 615). Then, an optimized scaling of the optimized crop windows in the optimized crop window path may be determined (block 620) and an optimized crop window path, found using another search, for example, by a dynamic programming technique, may be found for inner frames between the two optimized crop windows of the border frames (block 625).

In considering the choice of the length of subshots longer subshots may result in fewer and/or smaller artifacts, but more computational resources may be consumed in a search for the optimized crop window path, for example. Conversely, shorter subshots may result in less computational resources, but more and/or larger artifacts may be the result. The use of shots and subshots may provide a good trade-off between fidelity and eye inertness as well as make the processing (i.e., the retargeting) fast enough to satisfy real-time requirements.

As discussed above, a brute force approach may be used to find optimized crop windows for border frames at a start and an end of each subshot (block 615). According to an example embodiment, when an information loss metric is well defined, a coarse-to-fine search may be used to find the best retargeting window parameters; e.g., the location (x,y) of the top-left point of the retargeted window over original frame, and the scaling factor s. The search range of (x,y) is constrained by s and s is constrained by 1≤s≤min(Original width/Target width, Original height/Target height).

In order to reduce computational costs, the search for (x,y, s) may first be performed as a multi-step search, with a first search being performed on a coarse (x, y) grid (for example, a 10×10 grid search will save 99% computation over 1×1 grid search). A target parameter set $(x_1, y_1, s_1)$ is found after the coarse search. A second search may be a fine search within a range around $(x_1, y_1)$ with the fixed scaling factor s1, with dimensions of the range being based on an amount of computational resources available to perform the second search. After the two-step search, the best parameter set $(x_2, y_2, s_1)$ is obtained.

According to an example embodiment, within a shot, the optimal scale may be fixed as viewers are very susceptible to irregular zoom in and/or out artifacts. The optimal scale may be provided by brute force search on the border frames, that locate the start and end of the subshot, respectively (block 615). Alternatively, the optimal scale may be determined from the optimal scale determined in the brute force search in an additional operation (block 620) before the optimized crop window path has been found (block 625). In other words, block 620 can be performed along with block 615 or can be performed separately.

It is noted that the optimal scale that minimizes information loss function depends upon the weight of resizing degradation versus cropping degradation. Generally, the weight is specified according to the aesthetic preference of viewers and it is quite subjective among different viewers. However, some guidelines are provided below to measure how much resizing loss compared to cropping loss with respect to various video contents is acceptable in order to present a retargeted video that looks comfortable for most of viewers.

For many scenes in movies, as well as other forms of entertainment, news or commercials, video generally portrays foreground objects of interests with very a large portion of the frame and also in high resolution. Thus, although original resolution is reduced to some extent, resizing will not result in a blurred image. Here viewers are likely to be expecting a retargeted window with complete objects of interest because viewers usually prefer a global view with broad visible range rather than only a small and limited area due to cropping. Hence, priority is given to resizing over cropping.

For scenes in sports broadcasting or long distance shots, objects of interest can be very small with large background. Therefore, most viewers would like to focus on and track the object of interest without large resolution degradation. Otherwise, objects become too small to recognize. Hence, cropping should be more preferable to resizing.

Utilizing the above guidelines, it may be possible to find optimized scales for some frames in the original video via the brute force search and then combine (e.g., average, weighted average, median, or so on) them as the optimal scale for all of the frames of the shot. Typically, this simple method works fine. However, when cropping is given high priority (e.g., in situations with small crop windows) and also when the object of interest is moving fast temporally, the crop window may not include the complete object of interest.

Unlike a tracking window in object tracking tasks, which only focuses on local motion objects and discards all background motion information, the cropping window in retargeting wants to include complete local motion object of interest as well as preserve background motion information. The trace of dynamic crop windows within a shot may be a good measure of how fast the retargeting window moves temporally and it further suggests a probability of the retargeting window transition entirely not including local objects of interest throughout the shot. The faster the retargeting window moves, the more probable that it may leave some parts of an object of interest outside because it cannot move freely under the burden of background motion consistency due to viewer eye inertness constraints.

A two step predict-update method is adopted to refine the scale of the shot. In the prediction step, the combined (e.g., averaged) scale returned by brutal force search may be used as the scale of shot and yields the trace of dynamic crop windows (DCW).

A transition velocity may be expressed as $$\frac{1}{N}\sum_{i=1}^{N}\frac{(\hat{x}_i - \hat{x}_{i-1}) + (\hat{y}_i - \hat{y}_{i-1})^2}{L_i^2},$$

where $x_i$ and $y_i$ are the indices of the crop window in frame i of the shot, $x_{i-1}$ and $y_{i-1}$ are the indices of the crop window in frame i−1, and N is the total number of frames in the shot. $L_i$ is the maximum distance a crop window can move from $(x_{i-1}, y_{i-1})$.

In the update step of the algorithm previously described, based on the transition velocity of DCWs, the weight of resizing versus cropping in the information loss objective function may be adjusted to compensate for deviation from a reference transition velocity. The weight adjusting function is as follows $$\lambda' = \left(1 + \exp\left\{-\left|\frac{1}{N}\cdot\sum_{i=1}^{N}\frac{(\hat{x}_i - \hat{x}_{i-1}) + (\hat{y}_i - \hat{y}_{i-1})^2}{L_i^2} - v_\alpha\right|\right\}\right)^{-1},$$

where v is the predicted transition velocity of DCW and $v_\alpha$ is the reference velocity of motion saliency. Given the updated weight λ, the new scale average may be recalculated by the brute force search. Then the retargeting may be restarted to find the crop window path under the new scale.

Using the optimized crop window locations for the border frames of the subshot found using the brute force approach in block 615, for example, another search may be used to find the optimized crop window path through the inner frames connecting the two optimized crop window locations (block 625). According to an example embodiment, an objective function expressible as $$Q(\overline{x}_N, \overline{y}_N) = \sum_{i=1}^{N} I(x_i, y_i) + \varpi \cdot \sum_{i=1}^{N} EI(x_{i-1}, y_{i-1}, x_i, y_i),$$

may be used, where Q is the objective function that evaluates the retargeting performance. On the right hand side of the objective function, the first term $$\left(\sum_{i=1}^{N} I(x_i, y_i)\right)$$

is the information loss accumulation of a subshot and the second term $$\left(\varpi \cdot \sum_{i=1}^{N} EI(x_{i-1}, y_{i-1}, x_i, y_i)\right)$$

denotes the accumulation of artifacts within the subshot due to the crop window change. $\{x_i, y_i\}$ is the location of upper-left corner of crop window on frame i and N is the total number of frames in a subshot. $(\overline{x}_N, \overline{y}_N)$ is the dynamic trace of the upper-left corner of crop window over a subshot. A goal may be to find an optimal trace $(\overline{x}_N, \overline{y}_N)$ such that Q is minimized.

Figure 8:
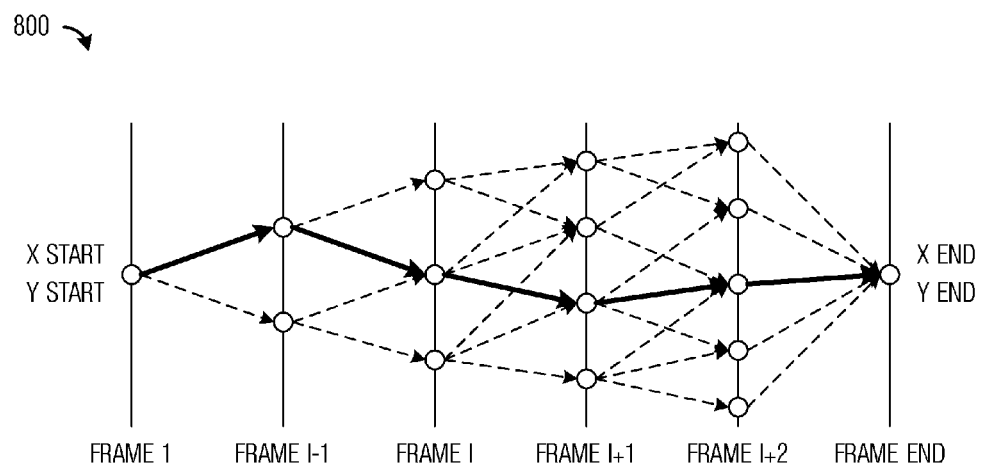
FIG. 8 illustrates an example graph according to example embodiments described herein.

FIG. 8 illustrates a graph 800. Graph 800 shows an optimized crop window path between optimized crop windows of a subshot. Graph 800 presents a model of the solution space $\{x_i, y_i\}_{i=1}^{N}$ in a subshot, where the upper-left corner candidate $\{x_i, y_i\}$ indexing the crop window of each frame is denoted as nodes and the transition $\{x_{i-1}, y_{i-1}, x_i, y_i\}$ of a crop window from one frame to the neighboring frame is denoted as edge. The cost of each node is information loss $I(x_i, y_i)$ and for each edge, the cost corresponds to artifact $EI(x_{i-1}, y_{i-1}, x_i, y_i)$ due to the crop window transition of the two ends of the edge. Thus minimizing the objective function Q is equivalent to find the shortest path on the graph, which can be easily solved by Dynamic programming, for example.

It is noted that in the graph, there exists an optimal sub-structure, that is, if $(\overline{x}_i^k, \overline{y}_i^k)$ is the shortest path from the starting node on frame 1 to node k on frame i, then the segment on the path up to frame p is also the shortest path from frame 1 to frame p, where p<i. Thus it may be possible to use dynamic programming to solve this problem.

The recursive format of the objective function is expressible as $$Q(\overline{x}_i^1, \overline{y}_i^1) = 0$$

$$Q(\overline{x}_i^k, \overline{y}_i^k) = \min_j\{Q(\overline{x}_{i-1}^j, \overline{y}_{i-1}^j) + \overline{\omega} \cdot EI(x_{i-1}^j, y_{i-1}^j, x_i^k, y_i^k)\},$$

where $\overline{x}_i^k, \overline{y}_i^k$ is the shortest path from the starting node on frame 1 to node k on frame i, $\overline{x}_{i-1}^j, \overline{y}_{i-1}^j$ is the shortest path up to node j on frame i−1, and $x_{i-1}^j, y_{i-1}^j, x_i^k, y_i^k$ denotes the edge connecting node j on frame i−1 to node k on frame i.

The locations returned by the brute force search on two border frames of the subshot may be initialized as the starting node and end node on the graph. Since there is only one node on frame 1, the shortest path is then the starting node and the minimal cost up to frame 1 is 0. Then the iterative function is applied to update the shortest path up to other frames. Suppose that the shortest path to every node on frame i−1 is already found, as well as the corresponding cost accumulation for any node k on frame i. The shortest path to node j on frame i−1 may then be extended to include node k on frame i, and a new path cost accumulation for all possible node j may be calculated. A path which yields the minimal cost accumulation on new paths may then be found. The shortest path up to node k on frame i is then updated as the shortest path up to node s at frame i−1 plus the edge from s to node k of frame i, where node s corresponds the minimal cost over all possible node j. The process may iterate until all the shortest paths up to every possible node on last frame is found and all corresponding costs accumulated. Then the cost accumulation may be updated by adding the edge cost from each of the node on the last frame to an end node previously known. Eventually the node on last frame with the minimal cost may be considered as the final node and backtracking from this node to frame 1 generates the shortest path of the graph. The shortest path is the dynamic trace of the optimized crop window from frame 1 to the end frame of a subshot. It is a trade-off of preserving video-dependent information with maintaining viewing consistency.

The algorithm presented above may be expressed in pseudo code as:

--- input: source node of crop pane $(x_1, y_1)$, destination node of crop pane $(x_N, y_N)$ and video frames $\{I_i\}_{i=1}^{N}$ of the subshot, the number of nodes C[i] of frame i;

output: Optimal trace $(\overline{x}_N, \overline{y}_N)$ as the shortest path from source to destination;

$x_1^1 \leftarrow x_1, y_1^1 \leftarrow y_1, Q(\overline{x}_1^1, \overline{y}_1^1) \leftarrow 0, (\overline{x}_1^1, \overline{y}_1^1) \leftarrow (x_1^1, y_1^1)$;

-continued

```
for i <- 2 to N do
    extract from video the i-th frame in subshot as I[i];
    calculate saliency map SM[i] of I[i];
    for k <- 1 to C(i) do
        calculate cost of Node (x_i^k, y_i^k) as L(x_i^k, y_i^k) in 1;
        T_opt <- ∞ ;
        for j <- 1 to C(i-1) do
            calculate Edge cost EI(x_{i-1}^j, y_{i-1}^j, x_i^k, y_i^k) ;
            T(x̄_{i-1}^j, ȳ_{i-1}^j, j) <- Q(x̄_{i-1}^j, ȳ_{i-1}^j) + ω̄ · EI(x_{i-1}^j, y_{i-1}^j, x_i^k, y_i^k) ;
            if T(x̄_{i-1}^j, ȳ_{i-1}^j, j) < T_opt then
                BackPt[(x̄_i^k, ȳ_i^k)] <- (x̄_{i-1}^j, ȳ_{i-1}^j) ;
                T_opt <- T(x̄_i^k, ȳ_i^k) ;
            end
        end
        Q(x̄_i^k, ȳ_i^k) <- T_opt + L(x_i^k, y_i^k) ;
    end
end
for k <- 1 to C(n) do
    T(k) <- Q(x̄_N^k, ȳ_N^k) + ω̄ · EI(x_N^k, y_N^k, x_N, y_N) ;
end
k̂ <- argmin_k T(k), (x̂_N, ŷ_N) <- (x_N^k̂, y_N^k̂) ;
for i <- N-1 to 2 do
    (x̂_{i-1}, ŷ_{i-1}) <- BackPt[(x̂_i, ŷ_i)] ;
end
(x̂_N, ŷ_N) <- {(x̂_1, ŷ_1) <- ... <- (x̂_N, ŷ_N)} ;
```

Figure 9:
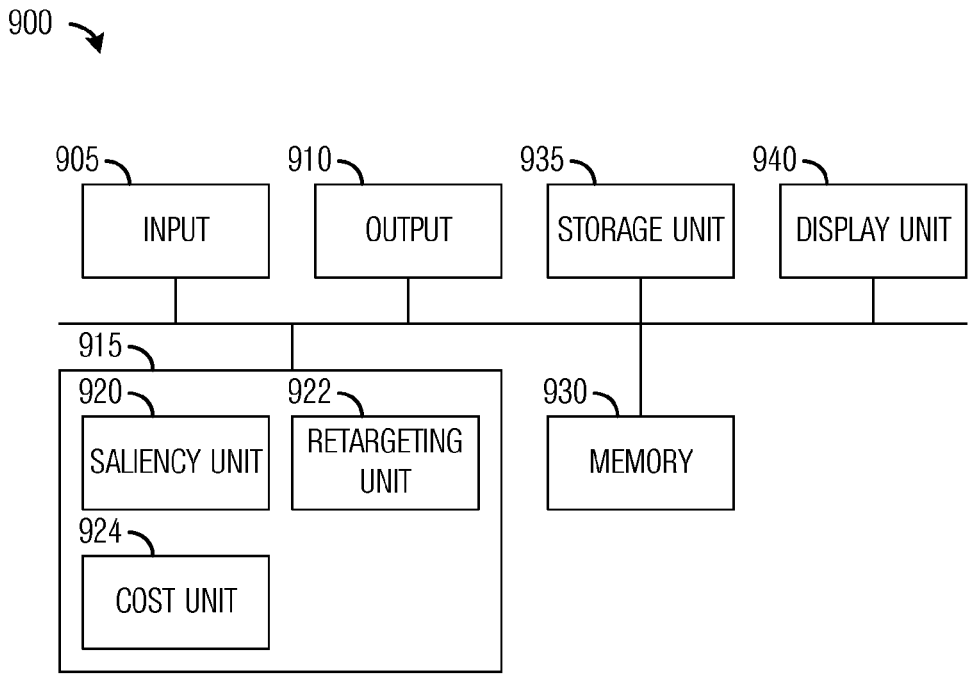
FIG. 9 illustrates an example system according to example embodiments described herein.

FIG. 9 provides an illustration of a system 900. System 900 may be an implementation of a system for retargeting videos. Alternatively, system 900 may be part of a display system. System 900 may be used to implement various ones of the embodiments discussed herein. As shown in FIG. 9, an input 905 is configured to receive videos for retargeting and an output 910 is configured to output retargeted videos. Input 905 and output 910 may have a wireless interface, a wireline interface, or a combination thereof. In practice, input 905 and output 910 might be implemented in a single unit of hardware.

A saliency detect unit 920 is configured to determine saliency information, including spatial saliency information, temporal saliency information, combined spatial-temporal saliency information, or combinations thereof, from frames of a video received at input 905. A retargeting unit 922 is configured to use the saliency information from saliency detect unit 920 to retarget the video to meet a desired image size of a display device. A cost unit 924 is configured to determine a cost metric for the video. The cost metric considers loss for individual frames of the video (e.g., cropping loss and/or scaling loss) as well as for the video (e.g., spatial factors and/or temporal factors).

A memory 930 is configured to store videos, saliency information, retargeting information, configuration parameters, and so forth. A storage unit 935 is configured to provide long term storage, e.g., through magnetic media, solid state media, optical media, and so on. Memory 930 and storage unit 935 may be considered to be different layers of storage available in system 900. A display unit 940 is configured to display videos, to provide an interface for interaction with a viewer or use of system 900, and so forth.

The elements of system 900 may be implemented as specific hardware logic blocks. In an alternative, the elements of system 900 may be implemented as software executing in a processor, microprocessor, digital signal processor, controller, application specific integrated circuit, or so on. In yet another alternative, the elements of system 900 may be implemented as a combination of software and/or hardware.

As an example, input 905 and output 910 may be implemented as a specific hardware block, while saliency detect unit 920 and retargeting unit 922 may be software modules executing in a processor 915, such as a microprocessor or a custom circuit or a custom compiled logic array of a field programmable logic array.

Figure 10:
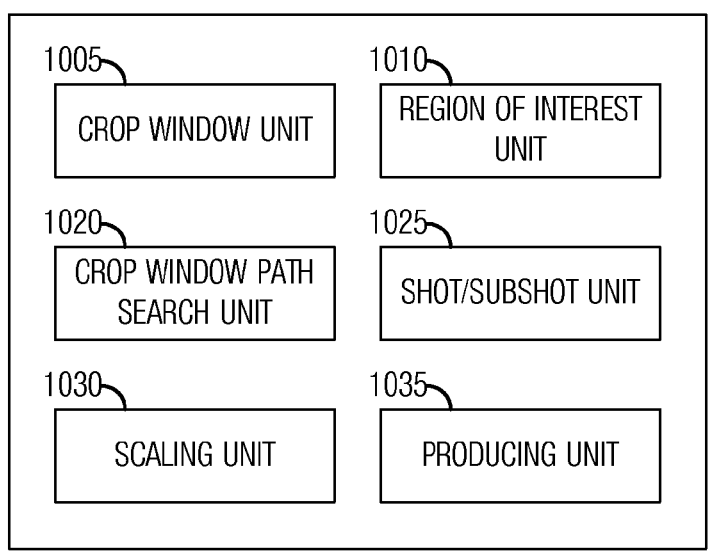
FIG. 10 illustrates an example detailed view of a retargeting unit according to example embodiments described herein.

FIG. 10 illustrates a detailed view of a retargeting unit 1000. Retargeting unit 1000 may be an implementation of retargeting unit 922 of FIG. 9. Retargeting unit 1000 includes a crop window unit 1005, a region of interest unit 1010, a crop window path search unit 1020, a shot/subshot unit 1025, a scaling unit 1030, and a producing unit 1035. Crop window unit 1005 is configured to select a crop window for a frame of a video based on contents of the frame, saliency information, and so on. Region of interest unit 1010 is configured to example a frame and determine regions of interests in the frame. Region of interest unit 1010 may make use of saliency information to determine the regions of interest.

Crop window unit 1005 is further configured to determine crop windows for frames at a beginning and an end of a sequence of frames, such as at the beginning and the end of a shot or subshot in the video. Crop window unit 1005 may utilize a brute force approach to find the crop windows for the two frames. A multi-step brute force approach may help to reduce computational requirements.

Crop window path search unit 1020 is configured to find crop windows for frames within a sequence of frames spanning a crop window at the beginning of the sequence of frames to a crop window at the end of the sequence of frames. Crop window path search unit 1020 may use dynamic programming techniques to minimize a cost objective function to find a least expensive path from the crop window at the beginning of the sequence of frames to the crop window at the end of the sequence of frames.

Shot/subshot unit 1025 is configured to find shots (sequences of like content frames) in videos. Shot/subshot unit 1025 may use techniques such as variance-difference, pixel differences, statistical differences, histograms, compression domain differences, edge tracking, motion vectors, and so on, to find shots. Shot/subshot unit 1025 is also configured to determine subshots in each shot. A subshot may be a fixed number of frames within a shot.

Scaling unit 1030 is configured to determine a scaling factor s for the frames of a shot or subshot. According to an example embodiment, a single scaling factor may be used for the frames of a shot or subshot to minimize artifacts that may negatively impact viewer experience. Producing unit 1035 is configured to generate a retargeted video from the crop windows based on the optimized crop window path, scaling factor s, and so on.

The above described embodiments of system 900 and retargeting unit 1000 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 3, 4, 5, and 6—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for retargeting a compressed video stream comprising a plurality of frames, the method comprising:
    determining saliency information for the plurality of frames, wherein the compressed video stream has been processed in accordance with an inter-frame prediction technique such that the plurality of frames include border frames and inner frames, the inner frames being positioned in-between the border frames;
    determining a cost metric for the compressed video stream, wherein the cost metric accounts for cropping, scaling, temporal factors, and spatial factors; and
    retargeting the compressed video stream in accordance with the saliency information and the cost metric to produce a retargeted video, wherein retargeting the compressed video stream comprises:
        obtaining a crop window for each border frame in the plurality of frames in accordance with a cropping loss and a scaling loss for the border frame;
        computing a non-linear crop window path over inner frames between the crop windows of border frames in accordance with spatial saliency information and temporal saliency information, the non-linear crop window path being computed without obtaining crop windows for the inner frames; and
        producing the retargeted video from the crop windows and the non-linear crop window path.

2. The method of claim 1, wherein the spatial factors comprise cropping loss and scaling loss for each frame in the plurality of frames.

3. The method of claim 1, wherein the temporal factors comprise motion information between frames in the plurality of frames.

4. The method of claim 1, wherein the saliency information comprises spatial saliency information, temporal saliency information, a fusion of spatial saliency information and temporal saliency information, or combinations thereof.

5. The method of claim 1, wherein determining saliency information comprises:
    applying a spatial processing algorithm to the compressed video stream to produce the spatial saliency information; and
    applying a motion processing algorithm to the compressed video stream to produce the temporal saliency information.

6. The method of claim 1, wherein determining saliency information comprises applying a non-linear domain fusion technique to the spatial saliency information and the temporal saliency information.

7. The method of claim 6, wherein applying the non-linear domain fusion technique comprises:
    spatially masking the spatial saliency information; and
    nonlinearly fusing the spatially masked spatial saliency information and the temporal saliency information.

8. The method of claim 1, wherein determining a crop window for each border frame comprises searching the border frame for a first object of interest.

9. The method of claim 8, wherein searching the border frame for a first object of interest comprises using a brute force search technique.

10. The method of claim 1, wherein determining a non-linear crop window path comprises determining a first non-linear crop window path for a first set of inner frames positioned between a first pair of border frames in a first sequence of frames.

11. The method of claim 10, wherein the compressed video stream comprises a plurality of sequences of frames, and wherein determining the non-linear crop window path comprises determining a respective non-linear crop window path for each sequence of frames in the plurality of sequences of frames.

12. The method of claim 10, wherein the sequence comprises a plurality of frames of the compressed video stream having related content.

13. The method of claim 10, wherein determining the non-linear crop window path comprises searching for a minimum cost path between a first crop window in a first border frame and a second crop window in a second border frame.

14. The method of claim 13, wherein searching for a minimum cost path comprises minimizing an objective function of video retargeting performance.

15. The method of claim 10, further comprising:
    determining a scaling factor for the sequence of frames, and
    applying the scaling factor to a crop window associated with each frame in the sequence of frames.

16. The method of claim 15, wherein determining a scaling factor comprises:
    combining a first scaling factor for a first crop window in a first border frame and a second scaling factor of a second crop window in a second border frame; and
    adjusting the combined scaling factor based on a transition velocity.

17. The method of claim 1, wherein determining saliency information comprises determining saliency information for each frame in the plurality of frames.

18. A device comprising:
    a processor; and
    a non-transitory computer readable storage medium storing programming for execution by the processor, the programming including instructions to:
        determine saliency information for a compressed video stream comprising a plurality of frames, wherein the compressed video stream has been processed in accordance with an inter-frame prediction technique such that the plurality of frames include border frames and inner frames, the inner frames being positioned in-between the border frames;
        determine a cost metric for the compressed video stream, and wherein the cost metric considers loss due to cropping, scaling, temporal factors, and spatial factors; and
        retarget the compressed video stream in accordance with the saliency information and the cost metric to produce a retargeted compressed video stream, wherein the instructions to retarget the compressed video stream include instructions to obtain a crop window for each border frame in the plurality of frames in accordance with a cropping loss and a scaling loss for the frame, to compute a non-linear crop window path over inner frames between the crop windows of border frames in accordance with spatial saliency information and temporal saliency information, the non-linear crop window path being computed without obtaining crop windows for the inner frames, and to produce the retargeted compressed video stream from the crop windows and the non-linear crop window path.

19. The device of claim 18, wherein the instructions to determine saliency information include instructions to:
   produce the spatial saliency information from the compressed video stream;
   produce the temporal saliency information from the compressed video stream; and
   fuse the spatial saliency information and the temporal saliency information to produce a spatial-temporal saliency map.

20. The device of claim 19, wherein the instructions to fuse the spatial saliency information include instructions to:
   mask the spatial saliency information; and
   fuse the masked spatial saliency information and the temporal saliency information.

21. The device of claim 19, wherein the compressed video stream comprises a plurality of sequences each of which including multiple inner frames positioned between two border frames.

22. A system comprising:
   a video processor configured to retarget a compressed video stream in accordance with a cost metric to produce a retargeted video, wherein the compressed video stream comprises a plurality of frames and has been processed in accordance with an inter-frame prediction technique such that the plurality of frames include border frames and inner frames, the inner frames being positioned in-between the border frames, wherein the cost metric considers loss due to cropping, scaling, temporal factors, and spatial factors, and wherein the video processor is configured to retarget the compressed video stream by obtaining a crop window for each border frame in the plurality of frames in accordance with a cropping loss and a scaling loss for the border frame, by computing a non-linear crop window path over inner frames between the crop windows of border frames in accordance with spatial saliency information and temporal saliency information, the non-linear crop window path being computed without obtaining crop windows for the inner frames, and by producing the retargeted video from the crop windows and the non-linear crop window path; and
   a memory coupled to the video processor, the memory configured to store the retargeted video.

23. The system of claim 22, wherein the video processor is further configured to:
   determine saliency information for the compressed video stream; and
   determine the cost metric for the compressed video stream.

24. The system of claim 23, wherein the video processor is configured to determine the saliency information by:
   producing the spatial saliency information from the compressed video stream;
   producing the temporal saliency information from the compressed video stream; and
   fusing the spatial saliency information and the temporal saliency information to produce spatial-temporal saliency map.

25. The system of claim 22, wherein the video processor comprises a microprocessor.

26. The system of claim 22, wherein the video processor comprises a digital signal processor.

* * * * *